(12) United States Patent
Ide et al.

(10) Patent No.: US 7,030,923 B2
(45) Date of Patent: Apr. 18, 2006

(54) DIGITAL CAMERA HAVING OVERLAPPED EXPOSURE

(75) Inventors: Hiroyuki Ide, Shijyonawate (JP); Shinji Ukita, Kawanishi (JP)

(73) Assignee: Sanyo Electric Co., Ltd., Osaka (JP)

( * ) Notice: Subject to any disclaimer, the term of this patent is extended or adjusted under 35 U.S.C. 154(b) by 827 days.

(21) Appl. No.: 09/816,672

(22) Filed: Mar. 26, 2001

(65) Prior Publication Data

US 2001/0030708 A1   Oct. 18, 2001

(30) Foreign Application Priority Data

Mar. 27, 2000   (JP) ............................. 2000-086893

(51) Int. Cl.
  *H04N 3/14*   (2006.01)
  *H04N 5/335*   (2006.01)
  *H04N 9/083*   (2006.01)
  *H04N 9/04*   (2006.01)
  *H04N 5/238*   (2006.01)

(52) U.S. Cl. ...................... 348/312; 348/279; 348/298; 348/322; 348/314; 348/364

(58) Field of Classification Search ................ 348/308, 348/294, 273, 322, 298, 312–314, 279, 364
See application file for complete search history.

(56) References Cited

U.S. PATENT DOCUMENTS

| | | | | |
|---|---|---|---|---|
| 4,670,777 A | * | 6/1987 | Ishikawa et al. ............ | 348/279 |
| 5,101,276 A | * | 3/1992 | Ohta ....................... | 348/221.1 |
| 5,455,621 A | * | 10/1995 | Morimura ................ | 348/229.1 |
| 5,471,515 A | * | 11/1995 | Fossum et al. ............... | 377/60 |
| 6,115,065 A | * | 9/2000 | Yadid-Pecht et al. ....... | 348/308 |
| 6,175,383 B1 | * | 1/2001 | Yadid-Pecht et al. ....... | 348/302 |
| 6,204,881 B1 | * | 3/2001 | Ikeda et al. ................ | 348/362 |
| 6,219,097 B1 | * | 4/2001 | Kamishima et al. ........ | 348/297 |
| 6,278,490 B1 | * | 8/2001 | Fukuda et al. ............. | 348/362 |
| 6,559,889 B1 | * | 5/2003 | Tanaka et al. ............. | 348/299 |
| 6,721,008 B1 | * | 4/2004 | Lee et al. ................... | 348/302 |
| 6,747,695 B1 | * | 6/2004 | Afghahi ..................... | 348/241 |
| 6,760,069 B1 | * | 7/2004 | Yanai ........................ | 348/273 |

FOREIGN PATENT DOCUMENTS

| | | |
|---|---|---|
| JP | 08-223488 | 8/1996 |
| JP | 09-181979 | 7/1997 |

* cited by examiner

*Primary Examiner*—Ngoc-Yen Vu
*Assistant Examiner*—Kelly Jerabek
(74) *Attorney, Agent, or Firm*—Westerman, Hattori, Daniels & Adrian, LLP.

(57) ABSTRACT

A digital camera includes a shutter button. When taking a still picture of a subject in response to operation of the shutter button, a TG carries out first exposure and second exposure. The first exposure and the second exposure are simultaneously started by the suspension of outputting a charge sweep-out pulse. Elapsing a first exposure period, the TG reads a first charge out of a part of the light-receiving elements, thereby ending the first exposure. Elapsing a second exposure period, a mechanical shutter is closed thereby ending the second exposure. A second charge produced due to the second exposure is read out after completing the transfer of the first charge. The first and second charges outputted from the CCD imager are combined together by an image combining circuit.

8 Claims, 15 Drawing Sheets

| Ye | Cy | Ye | Cy | Ye |
|----|----|----|----|----|
| G  | Mg | G  | Mg | G  |
| Ye | Cy | Ye | Cy | Ye |
| G  | Mg | G  | Mg | G  |
| Ye | Cy | Ye | Cy | Ye |
| G  | Mg | G  | Mg | G  |
| Ye | Cy | Ye | Cy | Ye |
| G  | Mg | G  | Mg | G  |

DIGITAL CAMERA HAVING OVERLAPPED EXPOSURE

BACKGROUND OF THE INVENTION

1. Field of the Invention

This invention relates generally to digital cameras and, more particularly, to a digital camera which generates a still image signal of one screen on the basis of the first charge produced due to first exposure by the image sensor and the second charge produced due to second exposure by the image sensor.

2. Description of the Prior Art

There is an example of a conventional digital camera of this kind as disclosed in Japanese Patent Laid-open No. 75118-1999[H04N5/335, H04N5/232] laid open on Mar. 16, 1999. This prior art aims at generating a still image signal extended in dynamic range by combining the charge acquired by long-time exposure and the charge due to short-time exposure. In the prior art, however, the short-time exposure is carried out after the completion of the long-time exposure. This increases the total time needed for exposure, thus resulting in a blurred picture taken of a subject moving at high speed.

SUMMARY OF THE INVENTION

Therefore, it is a primary object to provide a digital camera capable of preventing against a blurred picture taken of a subject.

A digital camera according to the present invention comprises: an image sensor formed, in a light-receiving surface, with a plurality of first light-receiving elements and a plurality of second light-receiving elements; a first exposer for subjecting the first light-receiving elements to first exposure for a first period; a second exposer for subjecting the second light-receiving elements to second exposure for a second period; an outputter for separately outputting, from the image sensor, a first charge produced in the first light-receiving elements due to the first exposure and a second charge produced in the second light-receiving elements due to the second exposure; and a generator for generating a still image signal of one screen on the basis of the first charge and the second charge; wherein the first period is shorter than the second period and overlapped in time with the second period.

The total exposure period is shortened by the overlap in time of the first and second periods. This suppresses blurring in a picture taken of a subject moving at high speed. Also, the dynamic range is enlarged by generating a still image signal of one screen on the basis of the first and second charges produced by exposures different in period.

In one example of the invention, a first applier applies a first charge read pulse to the first light-receiving elements, a second applier applies a second charge read pulse to the second light-receiving elements, and a third applier applies a charge sweep-out pulse to the first light-receiving elements and the second light-receiving elements. Meanwhile, a shutter member mechanically cuts off incident light on the light-receiving surface. At this time, the first exposer controls any two of the first applier, the third applier and the shutter member to carry out the first exposure while the second exposer controls any two of the second applier, the third applier and the shutter member to carry out the second exposure. Due to this, the first period can be made shorter than the second period, and the first and second periods can be overlapped in time.

In one preferred example, the first exposer controls start and end time points of the first exposure by the third and first appliers and the second exposer controls start and end time points of the second exposure by the third applier and the shutter member.

In another preferred example, the first exposer controls start and end time points of the first exposure by the first applier and the shutter member and the second exposer controls start and end time points of the second exposure by the third applier and the shutter member.

In another example of the invention, a color filter arranged with a plurality of color elements covers the light-receiving surface. In this case, the colors are assigned to both the first light-receiving elements and the second light-receiving elements. Accordingly, the first charges caused by each first light-receiving elements correspond to all the color components of the color filter while the second charges caused by each first light-receiving elements correspond to all the color components of the color filter Preferably the color filter comprises a plurality of color blocks including each of the colors, the first and second light-receiving elements being alternately arranged, in a predetermined number in each, in at least one of the vertical and horizontal directions. Furthermore, each of the color elements individually correspond to each of the first and second light-receiving elements, and the predetermined number is coincident with the number of color elements of the color block in a direction the first and second light-receiving elements are alternately arranged.

That is, where the first and second light-receiving elements are alternately arranged in the vertical direction, the predetermined number is the number of color elements of a color block in the vertical direction. Where the first and second light-receiving elements are alternately arranged in the horizontal direction, the predetermined number is the number of color elements of a color block in the horizontal direction.

In another example of the invention, the image sensor is an interline-transfer schemed CCD imager formed with a plurality of vertical transfer registers in the light-receiving surface.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a complementary color filter applied to the FIG. 1 embodiment;

DETAILED DESCRIPTION OF THE PREFERRED EMBODIMENTS

Figure 1:
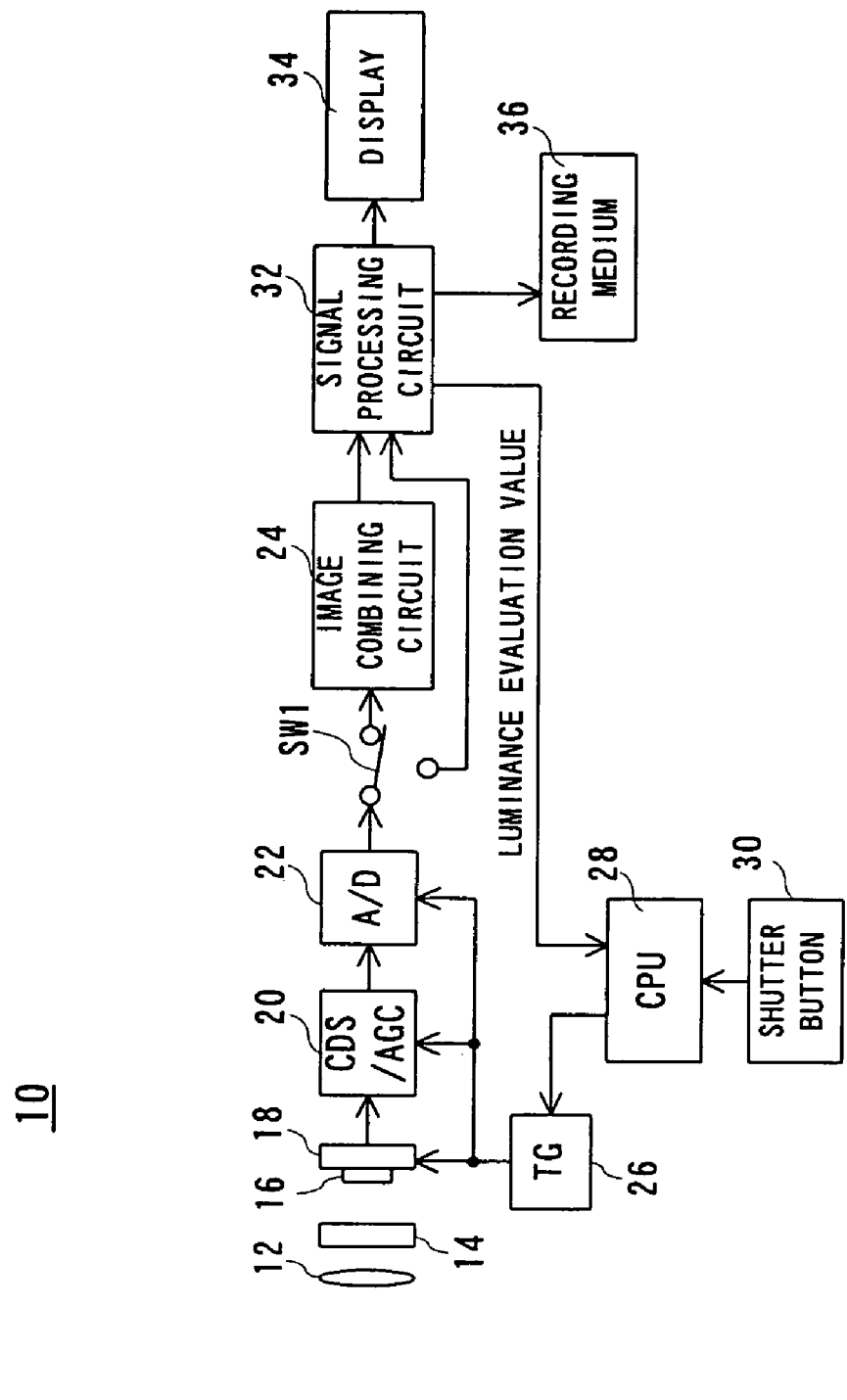
FIG. 1 is a block diagram showing an embodiment of this invention.

Referring to FIG. 1, a digital camera 10 of this embodiment includes an optical lens 12, a mechanical shutter 14 and a complementary color filter 16. The optical image of a subject is passed through these members and illuminated in a vertically inverted state onto a light-receiving surface of a CCD imager 18.

When displaying a real-time moving image (through-image) on a display 34, a timing generator (TG) 26 carries out pre-exposure at a time interval of one frame and reads the pixel signals (charges) produced by each of pre-exposure in a thin-out scheme out of the CCD imager 18. The read pixel signals are subjected to well-known noise removal and level adjustment by a CDS/AGC circuit 20. An A/D converter 22 converts the pixel signals thus processed into a digital signal. A switch SW1 is connected to a side of a signal processing circuit 32 so that the pixel signal outputted from the A/D converter 22 can be inputted to the signal processing circuit 32 without requiring a combining process by an image combining circuit 24. The signal processing circuit 32 performs a predetermined signal process on the input pixel signal to generate a YUV signal and supplies a generated YUV signal to a display 34. As a result, a through-image is displayed on the display 34.

When a shutter button 30 is pressed, a CPU 28 instructs the TG 26 to read out all the pixels (or thin-out reading). Thereupon, the TG 26 again carries out pre-exposure and reads out the image signal obtained due to the pre-exposure by an interlace scan scheme (or by thin-out reading mentioned above). The read pixel signal is supplied to the signal processing circuit 32 in the similar manner to the above. At this time, the signal processing circuit 32 converts the supplied pixel signal into a YUV signal and integrates the Y component contained in the converted YUV signal over one-frame period. The CPU 28 fetches an integration value (luminance evaluation value) from the signal processing circuit 32 and calculates an exposure time on the basis of the fetched luminance evaluation value. Note that two exposure time periods (first exposure time period and second exposure time period) are determined in order to extend the dynamic range. Determining a first exposure period and second exposure period, the CPU 28 controls the TG 26 and mechanical shutter 14 to carry out main exposure totally twice according to a first exposure period and second exposure period.

From the CCD imager 18, outputted first is the charge produced due to the main exposure in the first exposure period (first exposure pixel signal) and then the charge produced due to the main exposure in the second exposure period (second exposure pixel signal). Both the first exposure pixel signal and the second exposure pixel signal are converted into digital signals by the A/D converter 22 through noise removal and level adjustment by the CDS/AGC circuit 20. The switch SW1 at a start of the main exposure is connected toward the image combining circuit 24 so that the first and second exposure pixel signals outputted from the A/D converter 22 are inputted to the image combining circuit 24. The image combining circuit 24 makes a combining process on the first and second exposure pixel signals to generate a combined pixel signal (still image signal) extended in the dynamic range.

The signal processing circuit 32 makes a signal process on the combined pixel signal similarly to that upon outputting through-images, thereby generating a YUV signal to be outputted onto the display 34. On the display 34, a subject image (freeze image) due to main exposure is displayed. The signal processing circuit 32 furthermore makes JPEG compression on the YUV signal generated in the above signal process in response to a process instruction given from the CPU 28. Then, the compressed YUV signal produced by the JPEG compression is recorded to a recording medium 36.

The complementary color filter 16 includes color elements of Ye, Cy, Mg and G, as shown in FIG. 2. The complementary color filter 16, as viewed in a horizontal direction, has Ye and Cy color elements alternately arranged on the odd line and G and Mg color elements alternately arranged on the even line. Also, the complementary color filter 16, as viewed in the vertical direction, has G and Ye arranged alternately on the odd row and Mg and Cy alternately arranged on the even row. That is, the complementary color filter 16 includes a plurality of matrixes (color blocks) each comprising horizontally two pixels and vertically two pixels.

Figure 3:
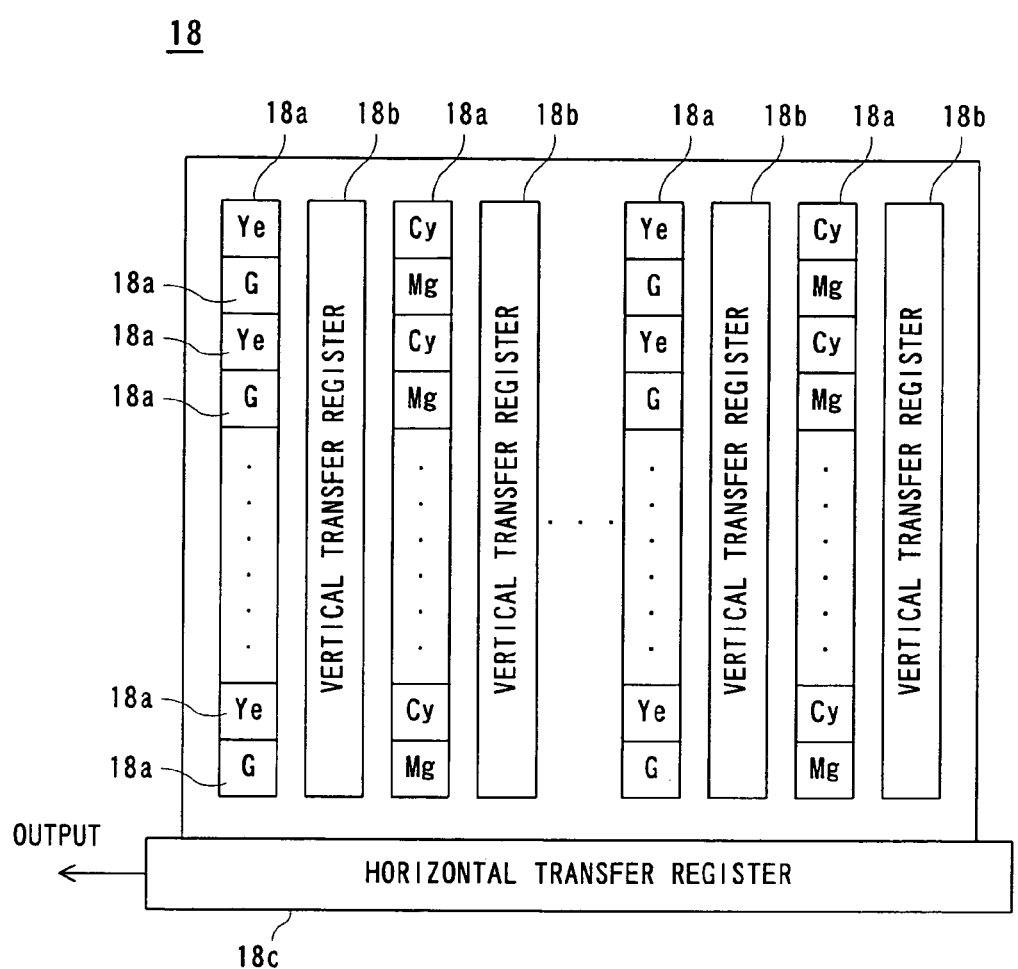
FIG. 3 is an illustrative view showing a CCD imager applied to the FIG. 1 embodiment.

Referring to FIG. 3, the CCD imager 18 is an interline-transfer-schemed image sensor. A plurality of light-receiving elements (pixels) 18a are formed on the light-receiving surface, which correspond one-to-one to a plurality of color elements of the complementary color filter 16. On the light-receiving element 18a, a charge corresponding to any one of color components Ye, Cy, Mg and G is produced by photoelectric conversion. The produced charge is read onto a vertical transfer register 18b and thereafter transferred in a vertical direction. Transferred to an end of the vertical transfer register 18b, the charge is then horizontally transferred by a horizontal transfer register 18c and outputted out of the CCD imager 18. The read and transfer processes of the charge are carried out in response to a drive pulse outputted from the TG 26.

Figure 4:
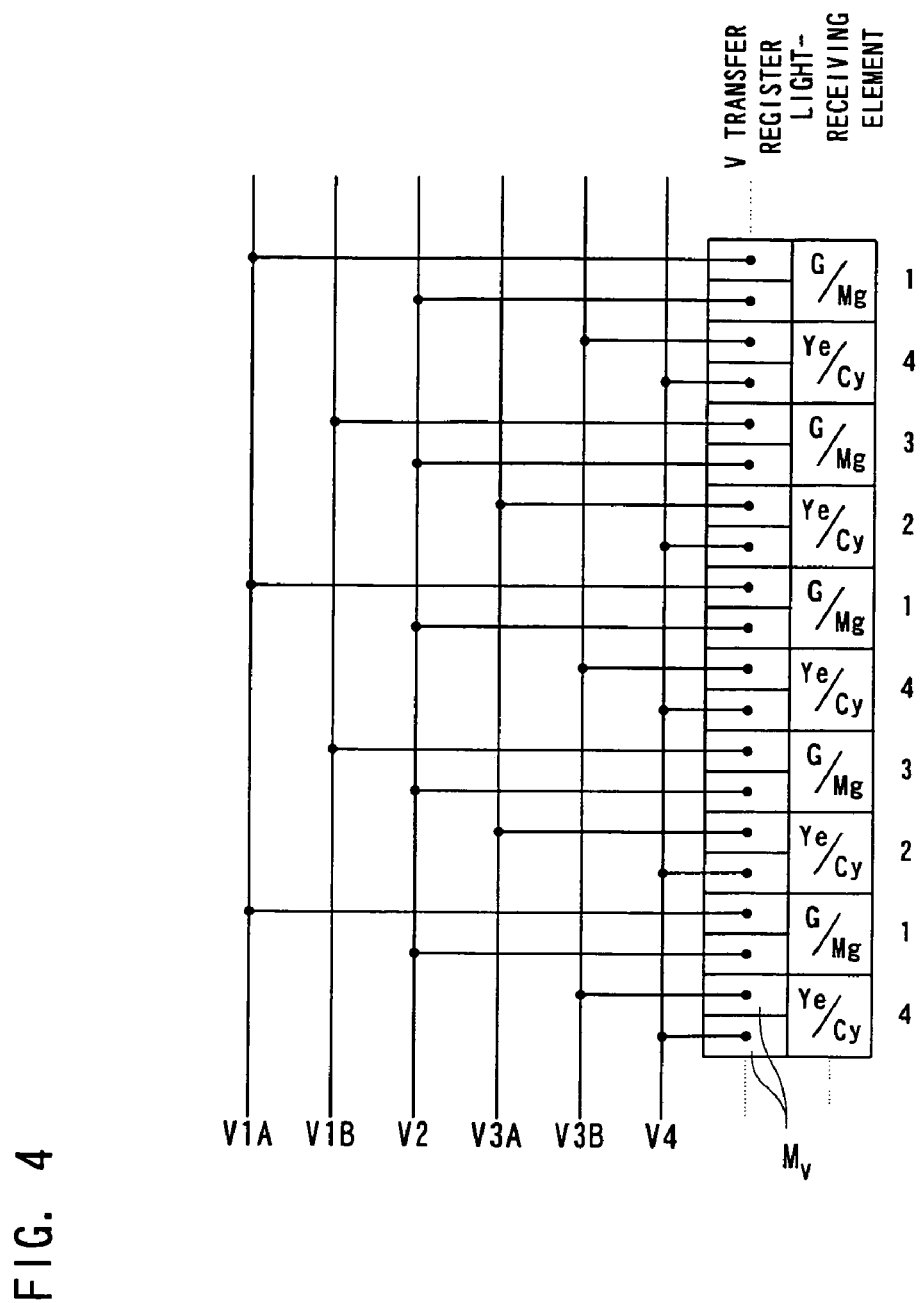
FIG. 4 is magnifying view of a part of the CCD imager shown in FIG. 3.

As shown in FIG. 4, the vertical transfer register 18b is formed with a plurality of metals $M_v$, and each light-receiving element 18a is assigned with two metals $M_v$. To each metal $M_v$ is applied any one of drive pulses V1A, V1B, V2, V3A, V3B and V4 outputted from the TG 26. If vertically successive four pixels are considered, the metal $M_v$ assigned to the G/Mg pixel of the first line from the bottom is applied by drive pulses V1A and V2. The metal $M_v$ assigned to the Ye/Cy pixel of the second line from the bottom is applied by drive pulses V3A and V4. Also, the metal $M_v$ assigned to the G/Mg pixel of the third line from the bottom is applied by drive pulses V1B and V2, while the metal $M_v$ assigned to the Ye/Cy pixel of the fourth line is applied by drive pulses V3B and V4. If the pixels forming each vertical row are considered as sets of four pixels, the drive pulses V1A, V1B, V2, V3A, V3B and V4 are supplied to each of the four pixels in the above manner.

Figure 5:
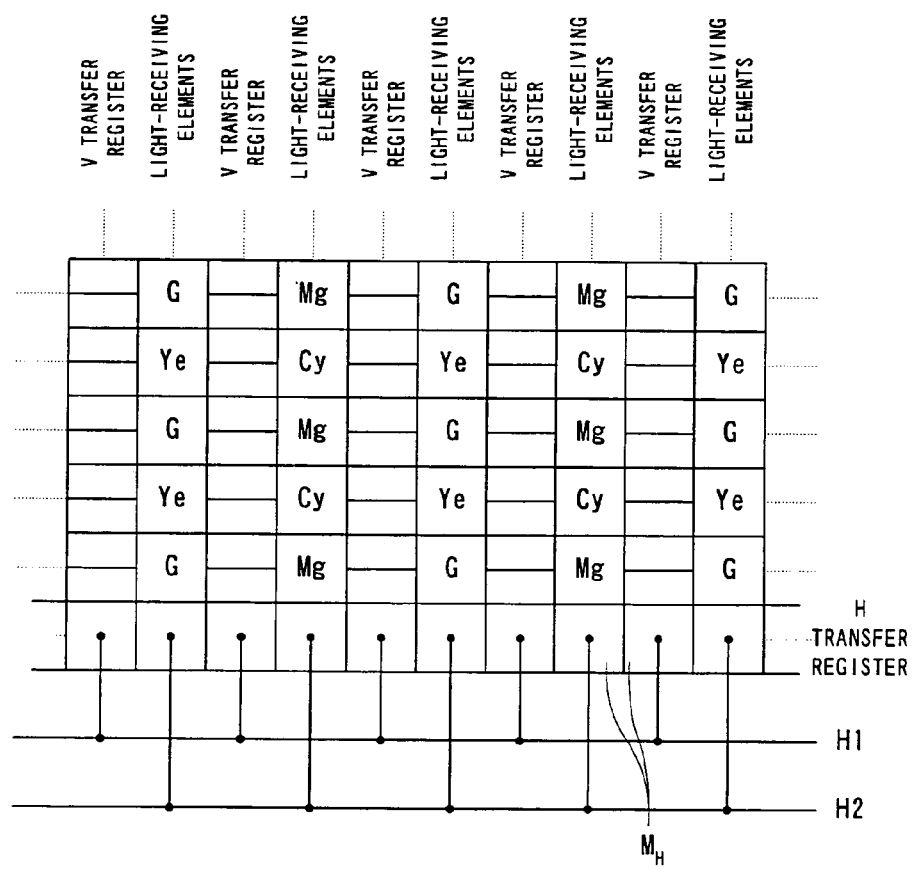
FIG. 5 is a magnifying view of another part of the CCD imager shown in FIG. 3.

As shown in FIG. 5, the horizontal transfer register 18c is also formed by a plurality of metals MH. It is however noted that one metal MH is assigned to the row on which the vertical transfer register 18b is provided and one metal to the row on which the light-receiving element 18*a* is provided. A drive pulse H1 is applied to the metal MH on the row having vertical transfer register 18*b* while a drive pulse H2 is to the metal MH on the row having the light-receiving element 18*a*.

Figure 6:
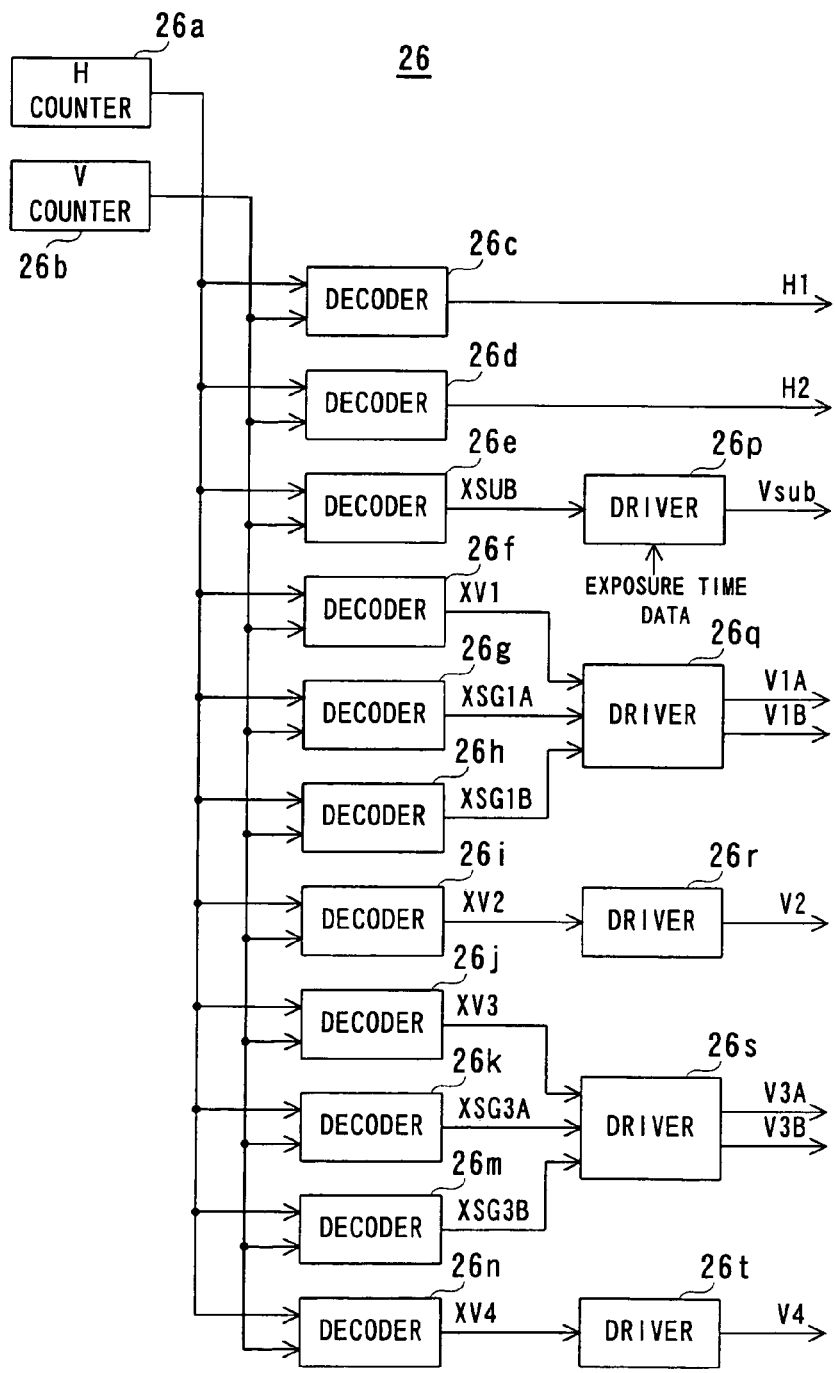
FIG. 6 is a block diagram showing a TG applied to the FIG. 1 embodiment.

The TG 26 is concretely configured as shown in FIG. 6. An H counter 26*a* has a count value (horizontal count value) to be incremented in response to a pixel clock and reset responsive to a vertical synchronizing signal. On the other hand, a V counter 26*b* has a count value (vertical count value) to be incremented in response to a horizontal synchronizing signal and reset responsive to a vertical synchronizing signal. The horizontal count value and the vertical count value are both supplied to decoders 26*c* –26*n*.

The decoders 26*c* and 26*d* respectively generate drive pulses H1 and H2 on the basis of a horizontal count value and a vertical count value. The decoder 26*e* generates a timing pulse XSUB on the basis of a horizontal count value and vertical count value. The driver 26*p* generates a charge sweep-out pulse VSUB on the basis of a timing pulse XSUB from the decoder 26*e* and exposure period data from the CPU 28.

The decoder 26*f*–26*h* respectively generate timing pulses XV1, XSG1A and XSG1B on the basis of the horizontal count value and vertical count value. The driver 26*q* generates drive pulses V1A and V1B on the basis of the timing pulses XV1, XSG1A and XSG1B from the decoders 26*f*–26*h*. The decoder 26*i* generates a timing pulse XV2 on the basis of the horizontal count value and vertical count value, while the driver 26*r* generates a drive pulse V2 on the basis of a timing pulse XV2 from the decoder 26*i*.

The decoders 26*j*–26*m* respectively generate timing pulses XB3, XSG3A and XSG3B on the basis of a horizontal count value and vertical count value. The driver 26*s* generates drive pulses V3A and V3B on the basis of the timing pulses XV3, XSG3A and XSG3B from the decoders 26*j*–26*m*. The decoder 26*n* generates a timing pulse XV4 on the basis of a horizontal count value and vertical count value, while the driver 26*t* generates a drive pulse V4 on the basis of a timing pulse XV4 from the decoder 26*n*.

Figure 7:
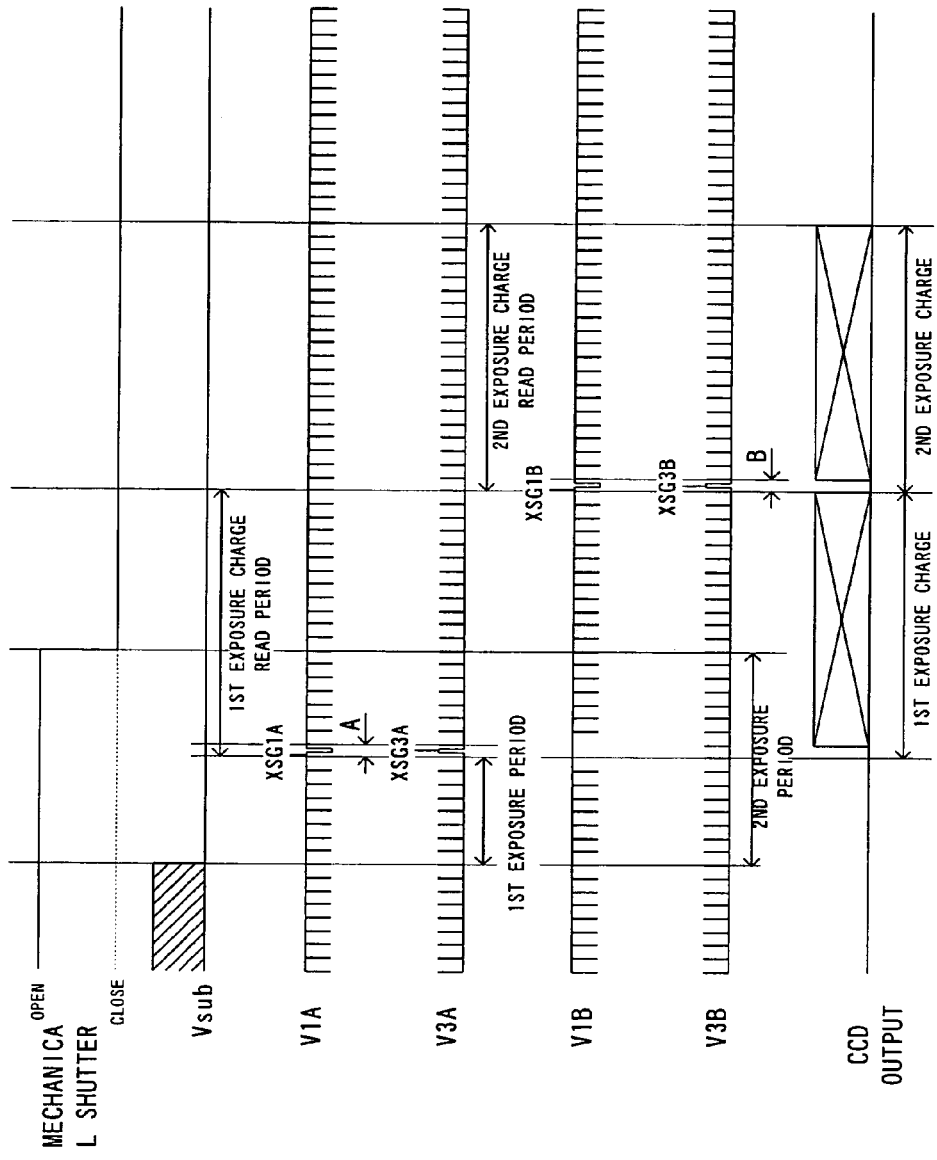
FIG. 7 is a timing chart showing a part of operation of the FIG. 1 embodiment.

When the shutter button 30 is operated, the charge sweep-out pulse Vsub, the drive pulses V1A, V3A, V1B and V3B vary in timing as shown in FIG. 7. First, a charge sweep-out pulse Vsub is outputted continuously. All the charge produced in each light-receiving element 18*a* is swept away in response to a charge sweep-out pulse Vsub. First exposure and second exposure are started simultaneous with the suspension of outputting the charge sweep-out pulse Vsub. Elapsing a first exposure period, components XSG1A and XSG3A are respectively superposed over the drive pulses V1A and V3A. This reads, onto the vertical transfer register 18*b*, the charge stored on the light-receiving elements 18*a* on the first and second lines shown in FIG. 4. The first exposure period completes with this reading out. The read charge (first exposure charge) is vertically transferred by the drive pulses V1A, V1B, V2, V3A, V3B and V4 and thereafter outputted through the horizontal transfer register 18*c*.

The mechanical shutter 14 changes from an open to close state in the course of vertically and horizontally transferring the first exposure charge, thereby ending the second exposure period. The charge built up on the light-receiving element 18*a* of the third and fourth lines due to the second exposure (second exposure charge) is read onto the vertical transfer register 18B by the component XSG1B superposed on the drive pulse V1B and the component XSG3B on the drive pulse V3B. The read second exposure charge is vertically transferred by the drive pulses V1A, V1B, V2, V3A, V3B and V4 and thereafter outputted through the horizontal transfer register 18*c*. Herein, the components XSG1B and XSG3B are outputted after completing the output of the first exposure charge, and accordingly the first and second exposure charges will not be mixed with each other over the vertical transfer register 18*b* or horizontal transfer register 18*c*.

Figure 8:
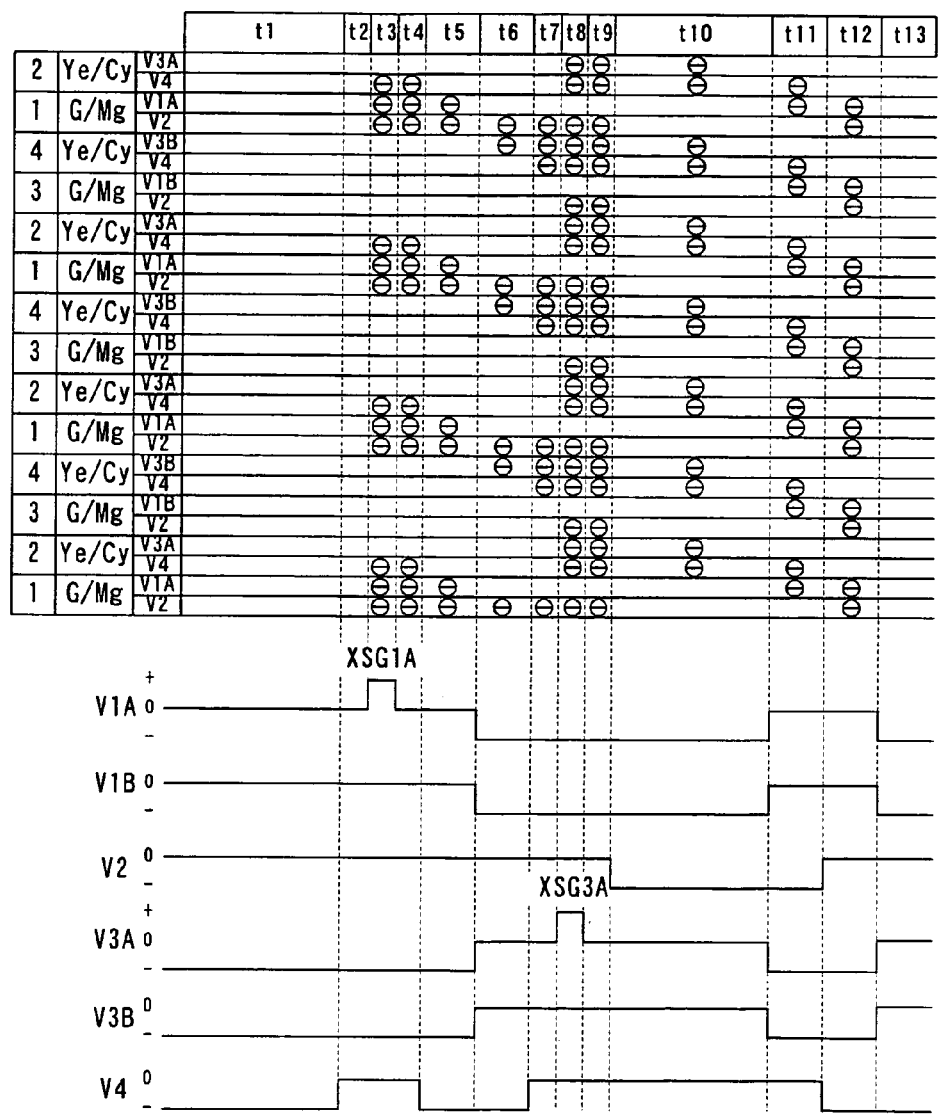
FIG. 8 is a timing chart showing the operation in period A shown in FIG. 7.

Referring to FIG. 8, explanation is concretely made on the operation at around outputting the components XSG1A and XSG3A (period A). In period t1, the drive pulses V1A, V1B and V2 assume a zero level, and the drive pulses V3A, V3B and V4 a minus level. In period t2, the drive pulse V4 changes from the minus level to a zero level. In period t3, the drive pulse V1A changes from the zero level to plus level. By changing the drive pulse V1A into the plus level, charge is read out of the G/Mg pixel of the first line. The read charge is built up on the two metals $M_v$ assigned to the G/Mg pixel of the first line (V1A and V2 are applied) and one metal MV assigned to the Ye/Cy pixel of the second line (V4 is applied).

In period t4, the drive pulse V1A returns from the plus level to zero level. In period t5, the drive pulse V4 returns to the zero level to minus level. By changing the drive pulse V4 from the zero to minus level, the charge read in the period t3 is built up on the two metals $M_v$ corresponding to the G/Mg pixel of the first line. In period t6, the drive pulses V1A and V1B change to minus level and the drive pulses V3A and V3B changes from the minus level to zero level. At this time, it is the drive pulses V2, V3A and V3B that assume zero level, wherein the charge is built up on the other metal $M_v$ assigned to the Ye/Cy pixel of the fourth line (V3B is applied) and one metal $M_v$ assigned to the G/Mg pixel of the first line (V2 is applied). In period t7, the drive pulse V4 changes from the minus level to zero level. This builds up the charge also on the one metal $M_v$ assigned to the Ye/Cy pixel of the fourth line (V4 is applied).

In period t8, the drive pulse V3A changes from the zero level to plus level thereby reading charge out of the Ye/Cy pixel of the second line. The read charge is built up on the two metals $M_v$ assigned to the Ye/Cy pixel of the second line (V3 and V4 are applied) and one metal $M_v$ assigned to the G/Mg pixel of the third line (V2 is applied). In period t9, the drive pulse V3A returns from the plus level to zero level. In period t10, the drive pulse V2 changes from the zero level to minus level. By changing the drive pulse V2 to the minus level, the charge is built up on the two metals assigned to the Ye/Cy pixel of the fourth line (V3A or V3B and V4 are applied).

In period t11, the drive pulses V1A and V1B change from the minus level to zero level and the drive pulses V3A and V3B return from the zero level to minus level. Due to this, the charge is built up on the other metal $M_v$ assigned to the G/Mg pixel of the third line (V1A or V1B is applied) and one metal $M_v$ assigned to the Ye/Cy pixel of the fourth line (V4 is applied). In period t12, the drive pulse V2 changes from the minus level to zero level and the drive pulse V4 changes from the zero level to minus level. At this time, the charge is built up on the two metal $M_v$ assigned to the G/Mg pixel of the first and third line (V1A or V1B and V2 are applied).

The charge produced due to the first exposure is thus read from the G/Mg pixel of the first line and Ye/Cy pixel of the second line onto the vertical transfer register 18*b*, and vertically transferred without being mixed with each other. Incidentally, no charge is read out of the G/Mg pixel of the third line and Ye/Cy pixel of the fourth line, and charge accumulation due to the second exposure is continued.

Figure 9:
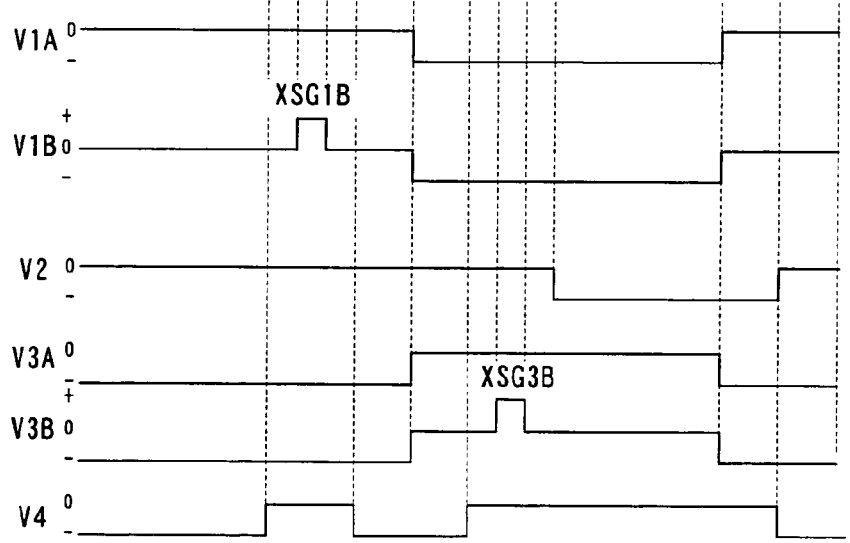
FIG. 9 is a timing chart showing the operation in period B shown in FIG. 7.

Referring to FIG. 9, explanation is made on the concrete operation at around the output of the components XSG1B and XSG3B (period B). In period t1, the drive pulses V1A, V1B and V2 assume a zero level and the drive pulses V3A, V3B and V4 a minus level. In period t2, the drive pulse V4 changes from a minus level to zero level. In period t3, the drive pulse V1B changes from the zero level to plus level. The charge stored on the G/Mg pixel of the third line is read out in period t3. The read charge is built up on the two metals $M_v$ assigned to the G/Mg pixel of the third line (V1B and V2 are applied) and one metal $M_v$ assigned to the Ye/Cy pixel of the fourth line (V4 is applied).

In period t4, the drive pulse V1B returns from the plus level to zero level. In period t5, the drive pulse V4 returns from the zero level to minus level. By changing the drive pulse V4 from the zero level to minus level, the charge read in the period t3 is built up on the two metals $M_v$ corresponding to the G/Mg pixel of the third line. In period t6, the drive pulses V1A and V1B change to minus level and the drive pulses V3A and V3B change from the minus level to zero level. At this time, the charge is built up on the other metal $M_v$ assigned to the Ye/Cy pixel of the second line (V3A is applied) and one metal $M_v$ assigned to the G/Mg pixel of the third line (V2 is applied). In period t7, the drive pulse V4 changes from the minus level to zero level, thereby accumulating charge also to the one metal $M_v$ assigned to the Ye/Cy pixel of the second line (V4 is applied).

In period t8, the drive pulse V3 changes from the zero level to plus level thereby reading charge from the Ye/Cy pixel of the fourth line. The read charge is built up on the two metals $M_v$ assigned to the Ye/Cy pixel of the fourth line (V3B and V4 are applied) and the one metal $M_v$ assigned to the G/Mg pixel of the first line (V2 is applied). In period t9, the drive pulse V3B returns from the plus level to zero level. In period t10, the drive pulse V2 changes from the zero level to minus level. The charge is stored to the two metals $M_v$ assigned to the Ye/Cy pixel of the fourth line (V3A or V3B and V4 are applied).

In period t11, the drive pulses V1A and V1B return from the minus level to zero level and the drive pulses V3A and V3B return from the zero level to minus level. Due to this, the charge is built up on the other metal $M_v$ assigned to the G/Mg pixel of the third line (V1A or V1B is applied) and the one metal $M_v$ assigned to the Ye/Cy pixel of the fourth line (V4 is applied). In period t12, the drive pulse V2 changes from the minus level to zero level and the drive pulse V4 changes from the zero level to minus level. At this time, the charge is built up on the two metals $M_v$ assigned to the G/Mg pixel of the third line V1A or V1B and V2 are applied.

The charge produced by the second exposure is thus read from the G/Mg pixel of the third line and Ye/Cy pixel of the fourth line onto the vertical transfer register 18b and then transferred separately in the vertical direction.

Figure 10:
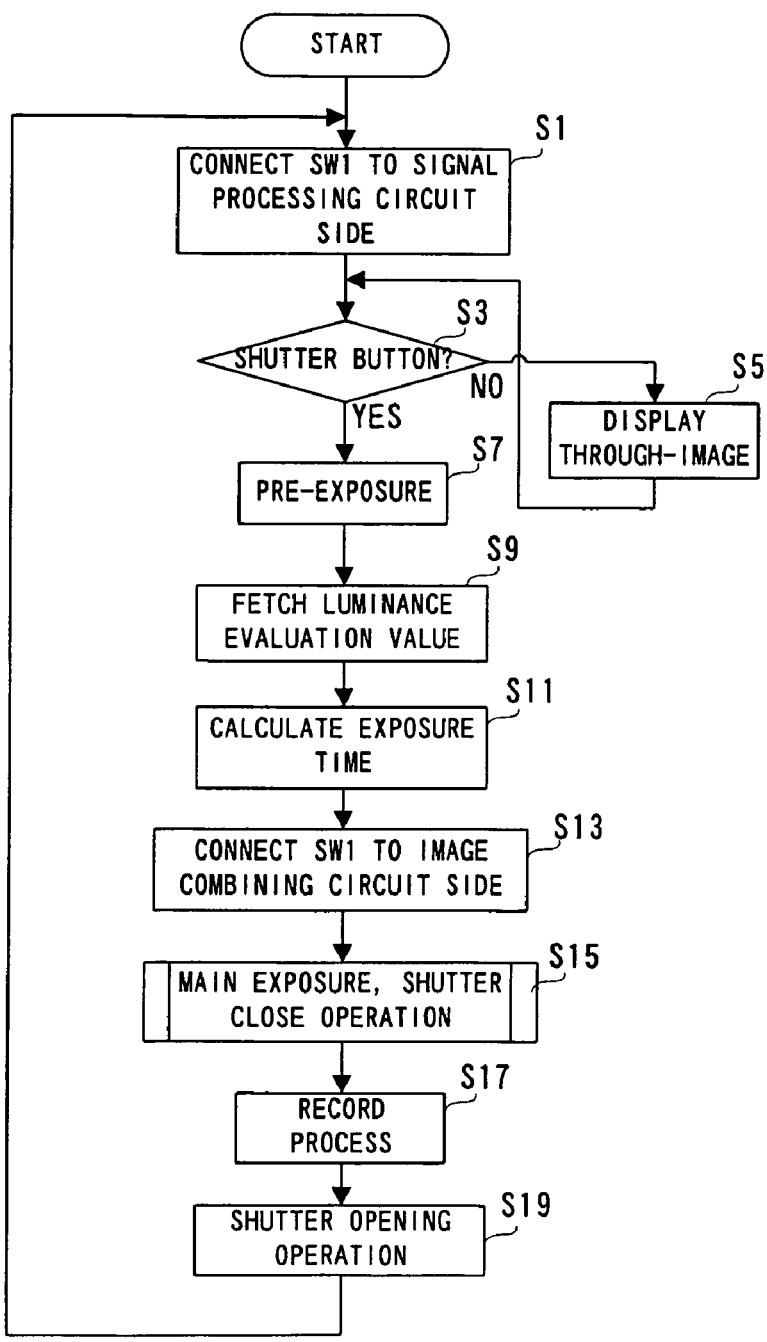
FIG. 10 is a flowchart showing an operation of a CPU applied to the FIG. 1 embodiment.

The CPU 28 concretely operates according to a flowchart shown in FIG. 10. When the power is on, first in step S1 the switch SW1 is connected toward the signal processing circuit 32. Next, it is determined in step S3 whether the shutter button 30 has been pressed or not. If "NO", the process proceeds to step S5 to make display process of a through image. That is, the TG is instructed to carry out thin-out reading and the signal processing circuit 32 is given a process command. Due to this, part of the pixel signal is outputted from the CCD imager 18. The output pixel signal is inputted to the signal processing circuit 32 through the CDS/AGC circuit command. Due to this, part of the pixel signal is outputted from the CCD imager 18. The output pixel signal is inputted to the signal processing circuit 32 through the CDS/AGC circuit 20, A/D converter 22 and switch SW1. The signal processing circuit 32 converts the input pixel signal into a YUV signal and outputs a converted YUV signal onto the display 34. This provides display of a through-image.

When the shutter button 30 is pressed, determination of "YES" is made in step S3. In step S7, the TG 26 is instructed to carry out pre-exposure and all-pixel read out. In step S9, a luminance evaluation value based on the pixel signal generated by the pre-exposure in the step S7 is fetched from the signal processing circuit 32. In the succeeding step S11 first and second exposure time periods are calculated on the basis of the fetched luminance evaluation value. Completing the process in the step S11, in step S13 the switch SW1 is connected to the image combining circuit 24. In step S15, the TG 26 is instructed to carry out main exposure and the mechanical shutter 14 is closed in predetermined timing. This outputs first and second exposure pixel signals out of the CCD imager 18, and the output pixel signals are combined together by the image combining circuit 24. In step S17, the signal processing circuit 32 is supplied with a record processing command. The combined pixel signal outputted from the image combining circuit 24 is converted into a YUV signal in the signal processing circuit 32 and subjected to JPEG compression. The compressed YUV signal is recorded in a recording medium 36. During a record process, the YUV signal based on the combined pixel signal is outputted also to the display 34 thereby displaying a freeze image. Completing the record process, in step S19 the mechanical shutter 14 is opened and then the process returns to step S1.

Figure 11:
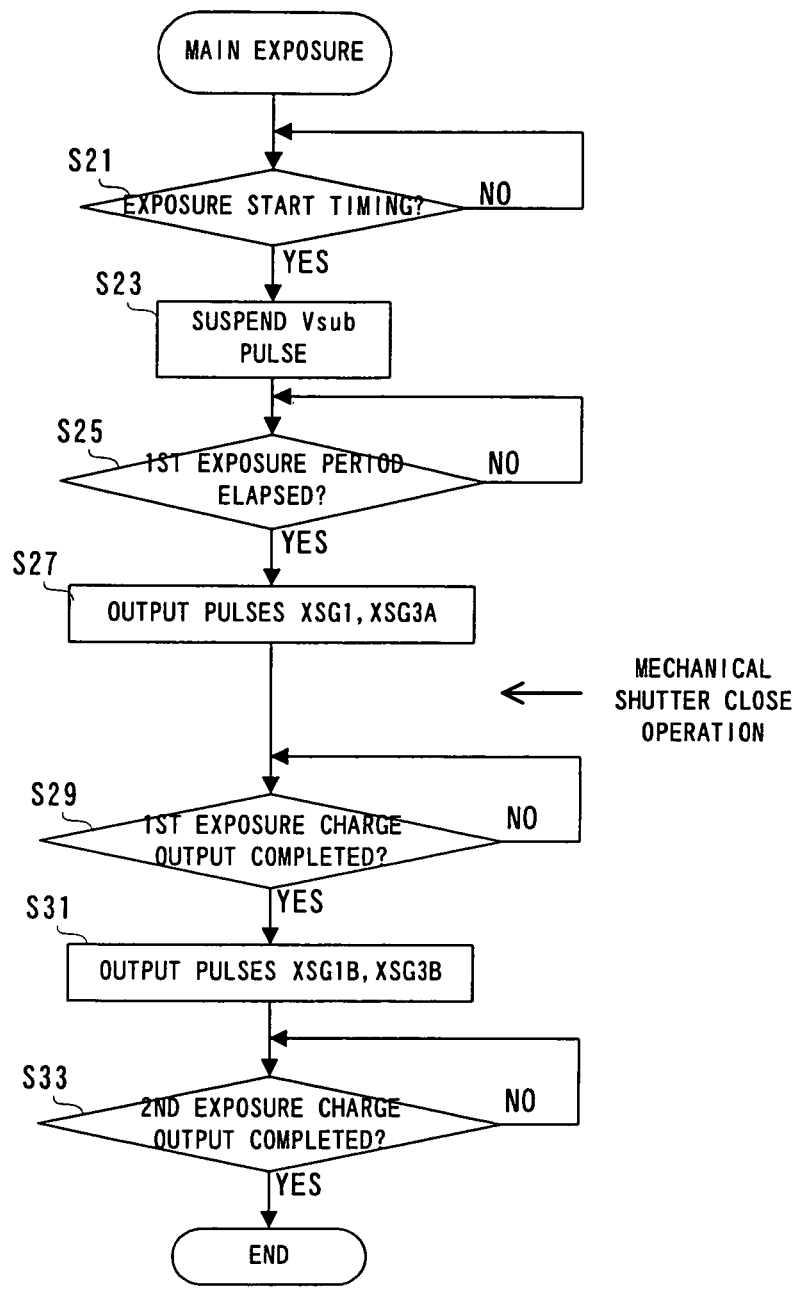
FIG. 11 is a flowchart showing an operation of the TG applied to the FIG. 1 embodiment.

The TG 26 when instructed for main exposure in step S15 operates according to a flowchart shown in FIG. 11. Note that this flowchart is for the explanation sake because the TG 26 is configured by hardware as described before. Also, at the time point of instructing the main exposure, the drive pulses H1 and H2 for horizontal transfer and the drive pulses V1A, V1B, V2, V3A, V3B and V4 for vertical transfer have already been outputted. A charge sweep-out pulse Vsub has been outputted in response to the vertical synchronizing signal.

First, the driver 26p determines in step S21 whether in timing for starting exposure on the basis of exposure-time data. When exposure-start timing comes, in step S23 the charge sweep-out pulse Vsub is suspended from outputting. This starts first exposure and second exposure. The decoders 26g and 26k in step S25 determines whether a first exposure period has elapsed or not. When a first exposure period has elapsed, in step S27 timing pulses XSG1A and XSG3A are outputted. The timing pulse XSG1A is superposed over the drive pulse V1A by the driver 29, while the timing pulse XSG3A is over the drive pulse V3A by the driver 26s. This reads charge (first exposure charge) from G/Mg pixel of the first line and Ye/Cy pixel of the second line, thus ending the first exposure. The read charge is passed through the vertical transfer register 18b and horizontal transfer register 18c and then outputted from the CCD imager 18.

After the process of step S27, the mechanical shutter 14 is closed in predetermined timing thereby ending the second exposure. The decoders 26h and 26m in step S29 determines whether the first exposure charge has been outputted or not. If having been outputted, in step S31 timing pulses XSG1B and XSG3B are outputted. The timing pulse XSG1B is superposed over the drive pulse V1B by the driver 26q while the timing pulse XSG3B is over the drive pulse V3B by the driver 26s. This reads charge (second exposure charge) from the G/Mg pixel of the third line and Ye/Cy pixel of the fourth line. If the second exposure charge has been outputted, "YES" is determined in step S33 thus ending the main exposure process.

According to this embodiment, first exposure and second exposure are simultaneously started by the suspension of outputting the charge sweep-out pulse Vsub. Also, the first exposure is ended by reading out the first exposure charge and the second exposure is ended by closing the mechanical shutter. This reduces the first exposure period shorter than the second exposure period, and overlaps in time the first exposure period with the second exposure period. Accordingly, by combining the first exposure charge (first exposure pixel signal) and the second exposure charge (second exposure pixel signal) in the image combining circuit, a combined image signal (still image signal) can be produced with enlarged dynamic range but less in blurring.

Meanwhile, in this embodiment, the image sensor at its light-receiving surface is covered with a complementary color filter arranged with color elements of Ye, Cy, Mg and G. Herein, the color elements G and Mg are assigned to the first and third lines while the color elements Ye and Cy are to the second and fourth lines. That is, the color elements Ye, Cy, Mg and G are assigned to both the light-receiving element subjected to first exposure (first light-receiving element) and the light-receiving element subjected to second exposure (second light-receiving element). Furthermore, the first light-receiving elements and the second light-receiving elements are alternately arranged two per each (coincident with the number of color elements of a color block in the vertical direction) in the vertical direction. Due to this, the first exposure pixel signal and the second exposure pixel signal each contain color components, Ye, Cy, Mg and G. Moreover, there is no great deviation between an image to be formed by the first exposure pixel signal and an image to be formed by the second exposure pixel signal.

A digital camera 10 of another embodiment is configured likewise the foregoing (as shown in FIG. 1 to FIG. 5) and hence duplicated explanation on the configuration will be omitted. The difference lies in the operation of the TG 26 and process of CPU 26 when making first exposure and second exposure to the CCD imager 18.

Figure 12:
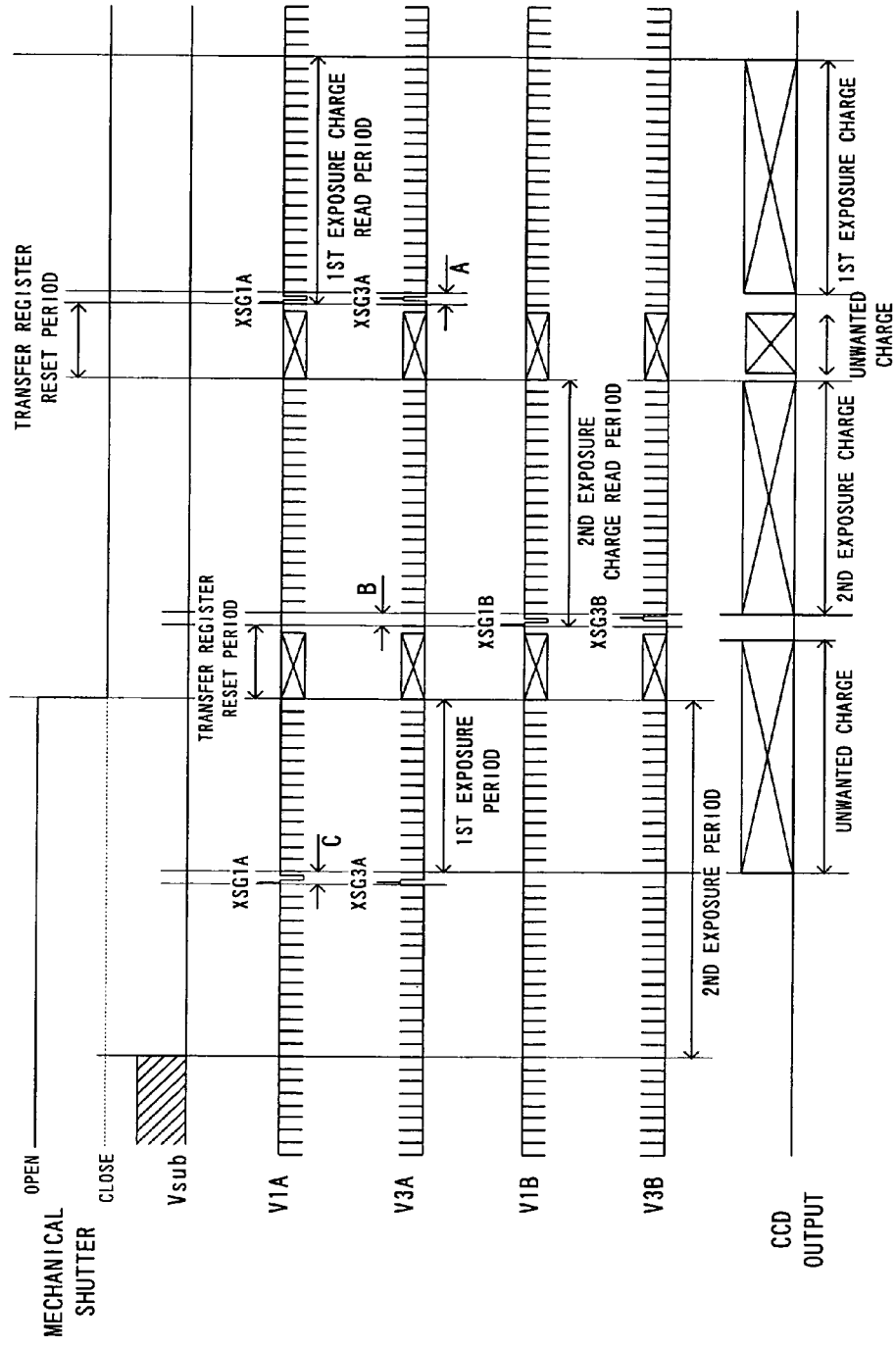
FIG. 12 is a timing chart showing a part of operation in another embodiment of this invention.

When the shutter button 30 is operated, the charge sweep-out pulse Vsub and the drive pulses V1A, V3A, V1B and V3B vary in timing as shown in FIG. 12. First, the charge sweep-out pulse Vsub is continuously outputted so that all the charge caused on the light-receiving elements 18a is swept away by the charge sweep-out pulse Vsub. When the charge sweep-out pulse Vsub is suspended from outputting, a second exposure period is started. After elapsing a predetermined time period from the start of the second exposure, the charge built up on the light-receiving element 18a on the first and second lines is read onto the vertical transfer register 18b by the component XSG1A superposed on the drive pulse V1A and component XSG3A on the drive pulse V3A. The charge read out herein is unwanted charge and the first exposure period is started upon reading the charge.

After elapsing a predetermined period from the start of the first exposure, the mechanical shutter 14 changes from an open to close state thereby ending both the first exposure and second exposure. After ending the first exposure and second exposure, the vertical transfer register 18b and the horizontal transfer register 18c are reset by the CPU 28 in order to exclude unwanted charge containing smear components. Elapsing a predetermined reset period, the charge built up on the light-receiving element 18a on the third and fourth lines (second exposure charge) is read onto the vertical transfer register 18b by the component XSG1B superposed on the drive pulse V1B and component XSG3B on the drive pulse V3B. The read second exposure charge is vertically transferred by the drive pulses V1B and V3B and thereafter outputted through the horizontal transfer register 18c.

After completing the reading of the second exposure charge, the vertical transfer register 18b and the horizontal register 18c are again reset by the CPU 28. After elapsing a predetermined reset period, outputted are a drive pulse V1A superposed with the component XSG1A and a drive pulse V1B with the component XSG3A. This reads the charge built up on the first exposure period to the vertical transfer register 18b from the light-receiving elements 18a of the first and second lines. The read first exposure charge is outputted through the horizontal transfer register 18c. In the second round of the period of outputting the components XSG1A and XSG3A (period A) and the period of outputting the components XSG1B and XSG3B (period B), the drive pulses V1A, V1B, V2, V3A, V3B and V4 vary as shown in FIG. 8 and FIG. 9. On the other hand, in the first round of the period of outputting the components XSG1A and XSG3A (period C), the drive pulses V1A, V1B, V2, V3A, V3B and V4 vary as shown in FIG. 13.

Figure 13:
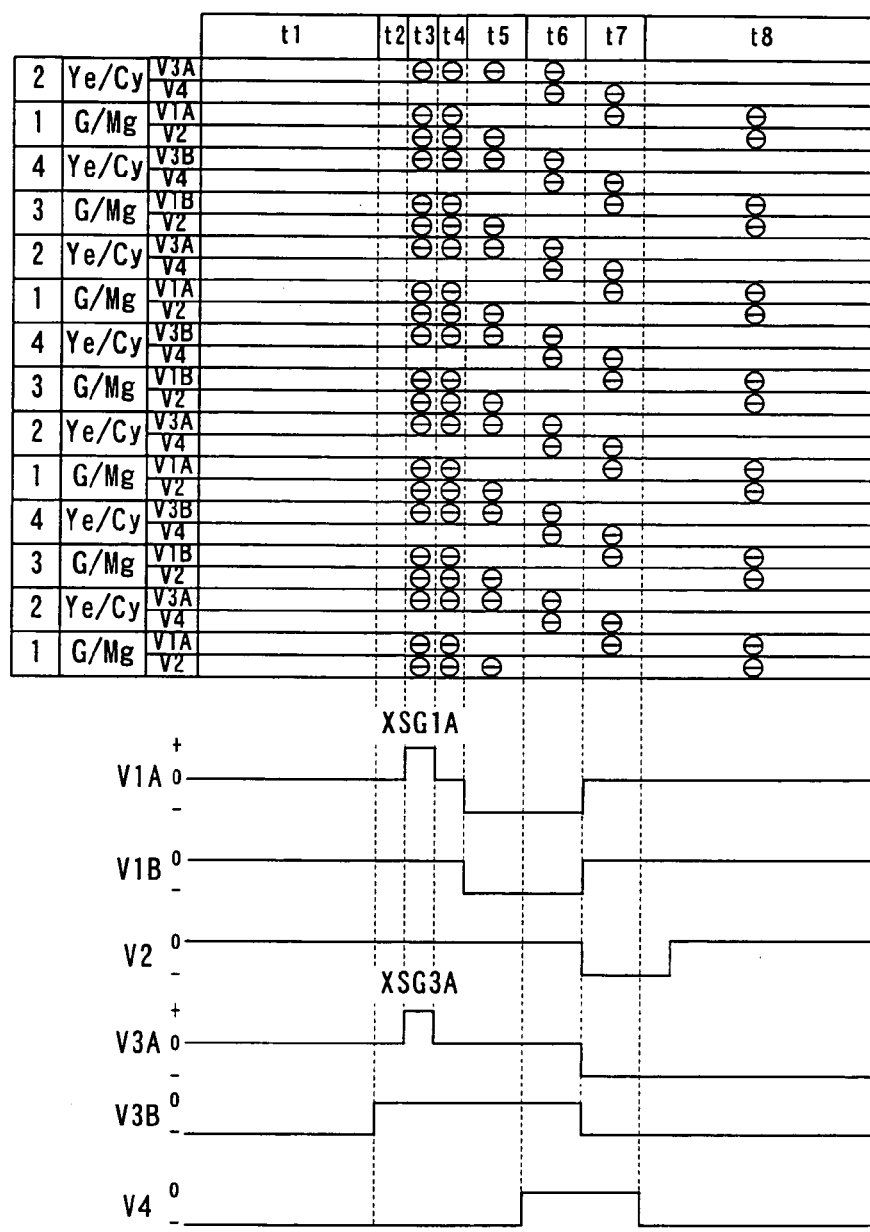
FIG. 13 is a timing chart showing the operation in period C shown in FIG. 12.

Referring to FIG. 13, in period t1 the drive pulses V1A, V1B, V2 and V3A assume a zero level and the drive pulses V3B and V4 a minus level. In period t2, the drive pulse V3B changes from the minus level to zero level. In period t3, the drive pulses V1A and V3 change from the zero level to plus level. This reads out the charge built up on the G/Mg pixel of the first line and Ye/Cy pixel of the second line. The charge read from the G/Mg pixel of the first line is stored in the two metals $M_v$ assigned to the same G/Mg pixel (V1A and V2 are applied and one metal $M_v$ assigned to the Ye/Cy pixel of the fourth line (V3B is applied). The charge read from the Ye/Cy pixel of the second line is built up on the other metal $M_v$ assigned to the same Ye/Cy pixel (V3A is applied) and the two metals $M_v$ assigned to the G/Mg pixel of the third line (V1B and V2 are applied).

In this manner, the charge read to the vertical transfer register 18b will be vertically transferred in period of t4 or the later. Note that this charge is unwanted charge and meaningless in the later-staged signal process.

Figure 14:
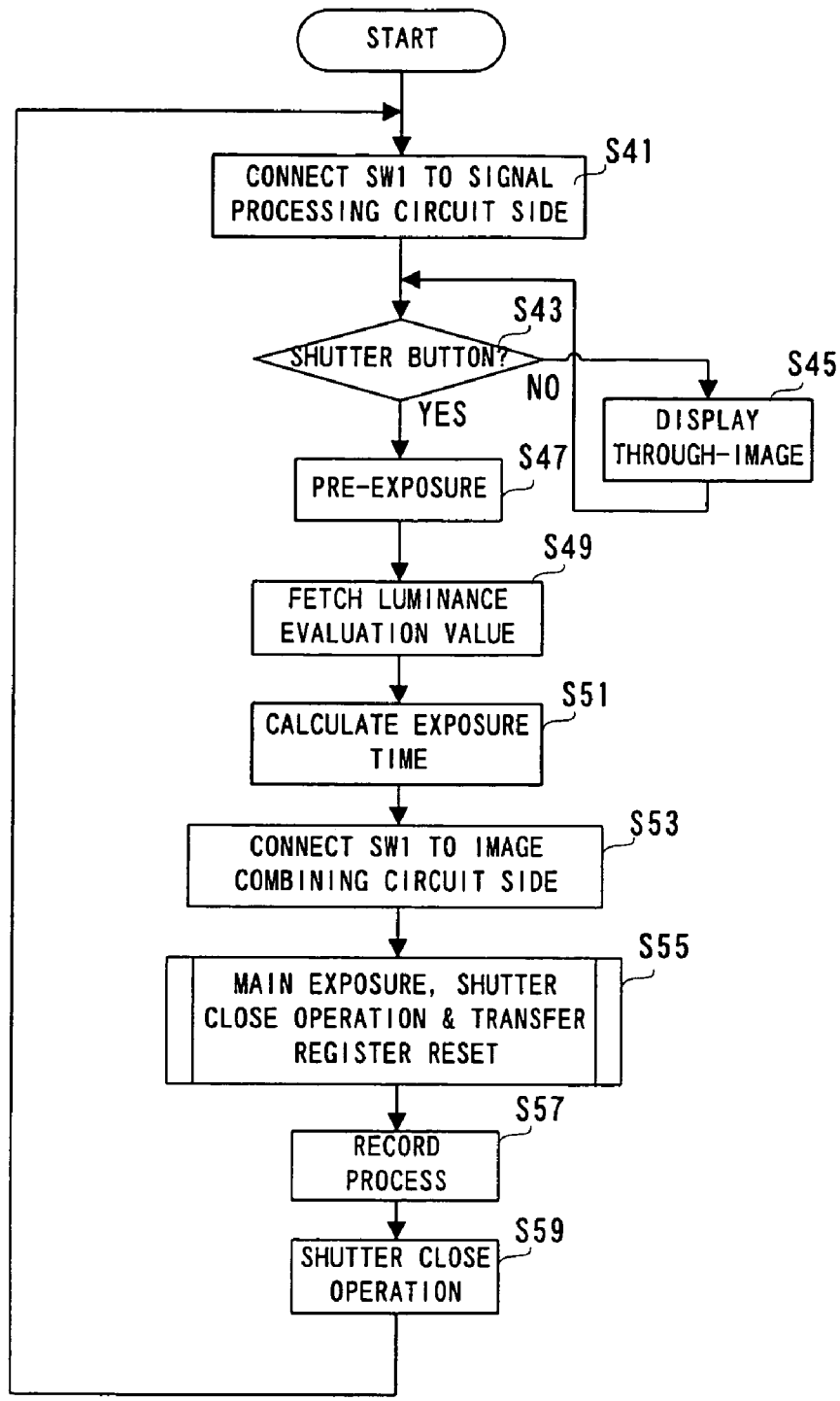
FIG. 14 is a flowchart showing an operation of the CPU applied to the FIG. 12 embodiment.

The CPU 28 concretely processes a flowchart shown in FIG. 14. Note that the steps S41–S53 and steps S57 and S59 in this flowchart is the same as that the steps S1–S13 and S17 and S19 shown in FIG. 10 and hence duplicated explanation will be omitted. In step S55, the TG 26 is instructed for main exposure. The mechanical shutter 16 is closed in timing of ending the first exposure and second exposure, and the vertical transfer register 18b and the horizontal transfer register 18c are reset in a predetermined period after ending the first and second exposure and in a predetermined period after ending the reading out of the second exposure charge.

Figure 15:
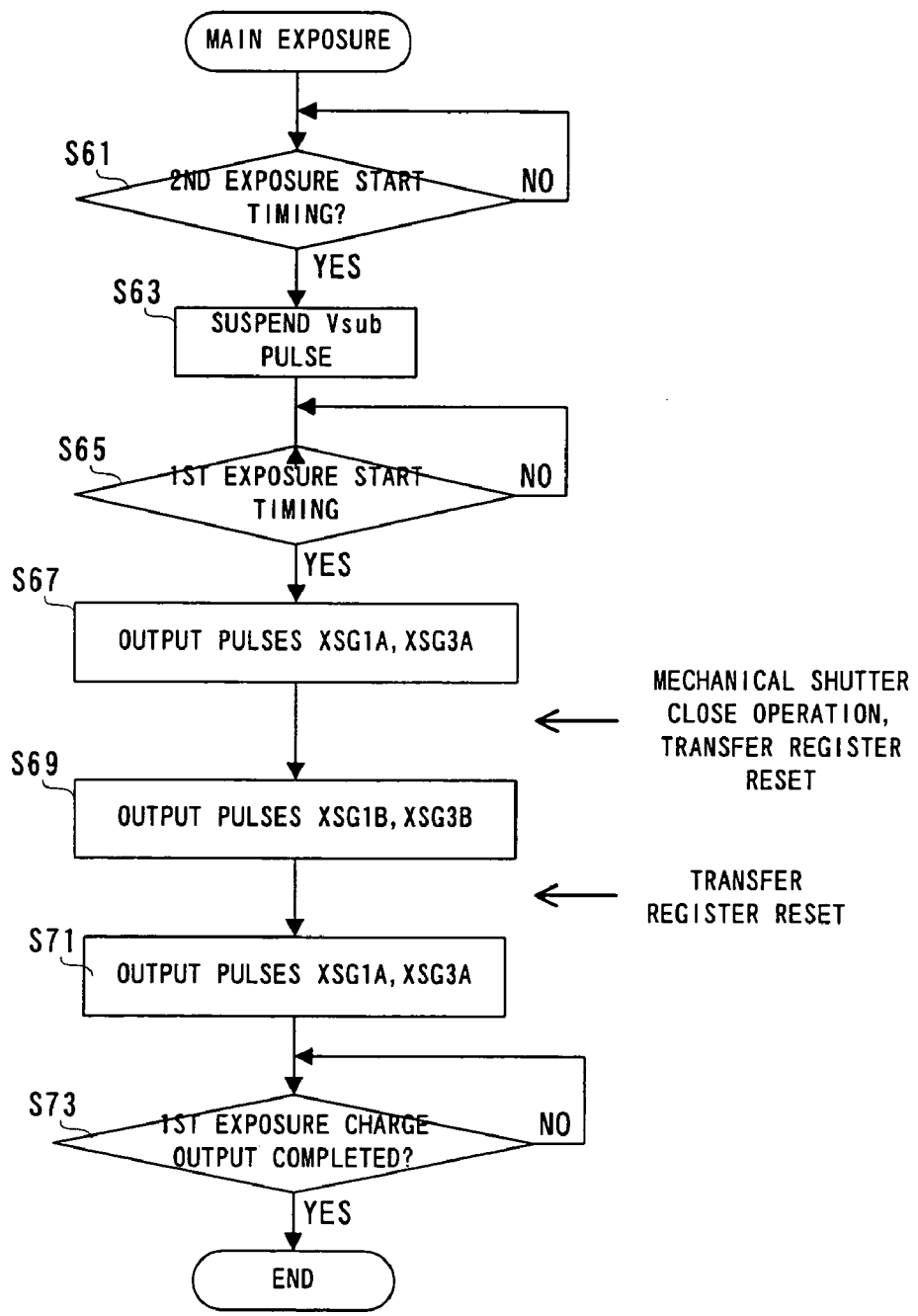
FIG. 15 is a flowchart showing an operation of the TG applied to the FIG. 12 embodiment.

TG 26 operates according to a flowchart shown in FIG. 15. In step S61, the driver 26p determines based on the exposure time data from the CPU 28 whether it is in second exposure start timing or not. When second exposure start timing comes, the driver 26p in step S63 suspends the charge sweep-out pulse Vsub from outputting. The decoders 26g and 26k determine in step S65 whether it is in first exposure start timing or not. When determined "YES", in step S67 timing pulses XSG1A and XSG3A are outputted. This reads the unwanted charge from the G/M pixel of the first line and Ye/Cy pixel of the second line. From then on, first exposure is started.

Elapsing a predetermined period from starting the first exposure, the CPU 28 closes the mechanical shutter 14 and resets the vertical transfer register 18b and horizontal transfer register 18c. The closure of the mechanical shutter 14 simultaneously completes the first exposure and the second exposure. Thus, the unwanted charge is excluded by resetting the vertical transfer register 18b and horizontal transfer register 18c.

After elapsing a predetermined reset period, the decoders 26h and 26m in step S69 outputs timing pulses XSG1B and XSG3B. This reads charges (second exposure charge) out of the G/Mg pixel of the third line and Ye/Cy pixel of the fourth line. The read second exposure charge is outputted through the vertical transfer register 18b and horizontal transfer register 18c. The CPU 28 resets the vertical transfer register 18b and horizontal transfer register 18c in the timing completing the output of the second exposure charge and excludes the second exposure charge remaining on the registers 18b and 18c. Step S71 is executed in the timing the predetermined reset period. In this step, the decoders 26g and 26k output timing pulses XSG1A and XSG3A, thereby reading the first exposure charge out of the G/Mg pixel of the first line and Ye/Cy pixel of the second line. The read first exposure charge is outputted through the vertical transfer register 18b and horizontal transfer register 18c. Completing the output of the first exposure charge, in step S73 determination of "YES" is made, thus ending the main exposure.

According to this embodiment, second exposure is started by suspending the charge sweep-out pulse Vsub from outputting while first exposure is started by reading out unwanted charge. Also, the closure of the mechanical shutter ends the first exposure and second exposure simultaneously. Due to this, the first exposure period is made shorter than the second exposure period, and the first exposure period and the second exposure period overlap in time. Accordingly, by combining the first exposure charge (first exposure pixel signal) and the second exposure charge (second exposure pixel signal) are combined in the image combining circuit, a combined pixel signal (still image signal) can be produced with enlarged dynamic range and less blurring.

Meanwhile, in this embodiment, the light-receiving surface of the image sensor is covered with a complementary color filter arranged with color elements Ye/Cy, Mg and G. All the colors Ye, Cy, Mg and G are assigned to the light-receiving elements to be subjected to first exposure (first light-receiving element) and light-receiving elements to be subjected to second exposure (second light-receiving element). Also, the first light-receiving elements and the second light-receiving elements are alternately arranged to in each in the vertical direction (coincident with the number of color elements of a color block in the vertical direction). Accordingly, the first exposure pixel signal and the second exposure pixel signal both include color components Ye, Cy, Mg and G, wherein there is no possibility of causing great deviation in level between the first exposure period signal and the second exposure pixel signal.

Incidentally, although the above two embodiments are attached with the complementary color filter on the light-receiving surface of the image sensor, a primary color filter may be of course used in place of the complementary color filter. Also, although the above two embodiments use the CCD-type image sensor, this invention can use a CMOS-type image sensor. Furthermore, although the CCD imager used in above two embodiments is an interlace-scan CCD imager, a progressive-scan (three or more metals are assigned to each light-receiving element) CCD imager may be used. Furthermore, although the above two embodiments had the first light-receiving elements and the second light-receiving elements arranged alternately, two in each (the vertical number of color elements in a color block) in the vertical direction, the first and second light-receiving elements may be alternately arranged, two in each, in the horizontal direction. Also, they may be arranged, two in each, in the both vertical and horizontal directions, i.e. in a mosaic form.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera comprising:
an image sensor formed, in a light-receiving surface, with a plurality of first light-receiving elements and a plurality of second light-receiving elements;
a first exposer for subjecting said first light-receiving elements to first exposure for a first period;
a second exposer for subjecting said second light-receiving elements to second exposure for a second period;
an outputter for separately outputting, from said image sensor, a first charge produced in said first light-receiving elements due to the first exposure and a second charge produced in said second light-receiving elements due to the second exposure; and
a generator for generating a still image signal of one screen on the basis of said first charge and said second charge,
wherein said first period starts simultaneously with said second period, is shorter than said second period and is overlapped in time with said second period,
said digital camera further comprising a first applier to apply a first charge read pulse to said first light-receiving elements, a second applier to apply a second charge read pulse to said second light-receiving elements, a third applier to apply a single charge sweep-out pulse to both said first light-receiving elements and said second light-receiving elements, and a shutter member to mechanically cut off incident light on said light-receiving surface, wherein said first exposer controls any two of said first applier, said third applier and said shutter member to carry out the first exposure while said second exposer controls any two of said second applier, said third applier and said shutter member to carry out the second exposure, and wherein said first exposer controls start and end time points of the first exposure by said first applier and said shutter member, respectively, and said second exposer controls start and end time points of the second exposure by said third applier and said shutter member, respectively.

2. A digital camera, comprising:
an image sensor formed, in a light-receiving surface, with a plurality of first light-receiving elements and a plurality of second light-receiving elements;
a first exposer for subjecting said first light-receiving elements to first exposure for a first period;
a second exposer for subjecting said second light-receiving elements to second exposure for a second period;
an outputter for separately outputting, from said image sensor, a first charge produced in said first light-receiving elements due to the first exposure and a second charge produced in said second light-receiving elements due to the second exposure;
a generator for generating a still image signal of one screen on the basis of said first charge and said second charge, wherein said first period is shorter than said second period and overlapped in time with said second period; and a color filter arranged with a plurality of color elements covering said light-receiving surface, wherein the colors are assigned to both the first light-receiving elements and said second light-receiving elements, and wherein said color filter comprises a plurality of color blocks including each of the colors, said first and second light-receiving elements being alternately arranged, in a predetermined number in each, in at least one of the vertical and horizontal directions, each of the color elements individually corresponding to each of said first and second light-receiving elements, and the predetermined number being coincident with the number of color elements of the color block in a direction said first and second light-receiving elements are alternately arranged.

3. A digital camera, comprising:

an image sensor of an interline-transfer type having a light-receiving surface on which a plurality of light-receiving elements and a plurality of vertical transfer registers are formed;

a color filter which is arranged with a plurality of color elements respectively corresponding to said plurality of light-receiving elements;

a shutter member for mechanically cutting off incident light on said light-receiving surface;

a first exposer for subjecting first light-receiving elements, which are a part of said plurality of light-receiving elements, to first exposure for a first period;

a second exposer for subjecting second light-receiving elements, which are another part of said plurality of light-receiving elements, to second exposure for a second period;

an outputter for separately outputting, from said image sensor, first charges produced by the first exposure and second charges produced by the second exposure; and a generator for generating a still image of one screen on the basis of the first charges and the second charges which are outputted by said outputter, wherein each of said plurality of color elements has any one of a plurality of colors, said plurality of color elements are formed of a plurality of color blocks to each of which all the plurality of colors are assigned, said plurality of light-receiving elements are alternated in a specific direction between the first light-receiving element and the second light-receiving element every predetermined number, the predetermined number is coincident with the number of color elements existing in the specific direction within each of said plurality of color blocks, and the first period is shorter than the second period and is overlapped in time with the second period.

4. A digital camera according to claim 3, further comprising:

a first applier for applying a first charge read pulse to said first light-receiving elements;

a second applier for applying a second charge read pulse to said second light-receiving elements; and a third applier for applying a charge sweep-out pulse to said first light-receiving elements and said second light-receiving elements, wherein said first exposer controls any two of said first applier, said third applier and said shutter member to carry out the first exposure while said second exposer controls any two of said second applier, said third applier and said shutter member to carry out the second exposure.

5. A digital camera according to claim 4, wherein said first exposer controls start and end time points of the first exposure by said third applier and said first applier, respectively, and said second exposer controls start and end time points of the second exposure by said third applier and said shutter member, respectively.

6. A digital camera according to claim 4, wherein said first exposer controls start and end time points of the first exposure by said first applier and said shutter member, respectively, and said second exposer controls start and end time points of the second exposure by said third applier and said shutter member, respectively.

7. A digital camera according to claim 3, wherein said image sensor is a CCD imager.

8. A digital camera according to claim 3, wherein the specific direction is one of a vertical direction and a horizontal direction.

* * * * *